US011238352B2

(12) United States Patent
Kuan et al.

(10) Patent No.: US 11,238,352 B2
(45) Date of Patent: Feb. 1, 2022

(54) MACHINE LEARNING TECHNIQUES TO PREDICT GEOGRAPHIC TALENT FLOW

(71) Applicant: Microsoft Technology Licensing, LLC, Redmond, WA (US)

(72) Inventors: Chi-Yi Kuan, Fremont, CA (US); Shen Huang, San Jose, CA (US); Yu Wang, Sunnyvale, CA (US); Yongzheng Zhang, San Jose, CA (US); Paul Ko, San Francisco, CA (US); Shady Elasra, San Francisco, CA (US); Fanbin Bu, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 979 days.

(21) Appl. No.: 15/941,236

(22) Filed: Mar. 30, 2018

(65) Prior Publication Data

US 2019/0303773 A1    Oct. 3, 2019

(51) Int. Cl.
*G06N 5/04* (2006.01)
*G06N 99/00* (2019.01)
*G06N 20/00* (2019.01)
*H04L 29/08* (2006.01)

(52) U.S. Cl.
CPC .............. *G06N 5/04* (2013.01); *G06N 20/00* (2019.01); *H04L 67/306* (2013.01)

(58) Field of Classification Search
CPC .......... G06N 20/00; G06N 5/04; G06Q 10/04; G06Q 10/063; H04L 67/306
See application file for complete search history.

(56) References Cited

U.S. PATENT DOCUMENTS

| | | | |
|---|---|---|---|
| 10,572,835 B2* | 2/2020 | Haririnia | G06Q 10/101 |
| 2011/0276407 A1* | 11/2011 | Bangera | G06Q 30/0269 |
| | | | 705/14.66 |
| 2018/0005190 A1* | 1/2018 | Innes | G06Q 10/0639 |
| 2018/0018572 A1* | 1/2018 | Wang | G06Q 10/04 |
| 2018/0158011 A1* | 6/2018 | Barlow | G06Q 10/063112 |
| 2018/0181973 A1* | 6/2018 | Lynch | G06Q 10/06315 |
| 2018/0293485 A1* | 10/2018 | Merhav | G06N 20/00 |
| 2018/0357564 A1* | 12/2018 | Braghin | G06N 5/04 |
| 2019/0104596 A1* | 4/2019 | Den Hartog | H05B 47/115 |
| 2019/0130281 A1* | 5/2019 | Yang | G06N 3/0427 |
| 2019/0188284 A1* | 6/2019 | Kohli | G06F 16/29 |
| 2019/0236718 A1* | 8/2019 | Rastkar | H04L 67/306 |

* cited by examiner

*Primary Examiner* — Abdullahi E Salad
(74) *Attorney, Agent, or Firm* — Schwegman Lundberg & Woessner, P.A.

(57) ABSTRACT

Techniques are provided for predicting talent flow to and/or from a geographical region. In one technique, multiple entity profiles are stored and analyzed to generate training data that is labeled indicating whether a corresponding entity has moved to or moved from a region. A machine-learned prediction model is generated or trained based on the training data. Using the machine-learned prediction model, a prediction is made whether, for each entity corresponding to another entity profile, that entity will move to or move from a particular geographic region. Based on multiple predictions, a number of entities that are predicted to move to or move from the particular geographic region is determined. Talent flow data that is based on the number of entities is presented on a computer display.

20 Claims, 6 Drawing Sheets

MACHINE LEARNING TECHNIQUES TO PREDICT GEOGRAPHIC TALENT FLOW

TECHNICAL FIELD

The present disclosure relates to machine learning and, more particularly, to analyzing past online activity to generate one or more prediction models to predict movement of people from one geographic region to another.

BACKGROUND

The large scale movement of people from one place to another has been a phenomenon from time immemorial. Reasons for such movement include escaping war, poverty, and political oppression, and seeking freedom and economic opportunity. Such movement not only has a large impact on the people who are moving, but also on the people and governments of the destination and the people and governments of the place of departure. For example, government and civic organizations of the destination may be ill equipped to address the challenges that come with an influx of people, such as food, housing, education, and transportation services. On the other hand, an area that loses a significant number of people will see a negative impact on local industry and civic institutions, especially if the departing people have valuable skills that are not generally found among the remaining population.

In the modern, global economy, especially in industrialized nations, the movement of people within a country and between countries is even more common place. While the movement of such people may be subtle (especially if only general population statistics are considered), the movement has a significant impact, particularly at the local level, including states, provinces, counties, cities, and towns. Local governments and civic institutions are often slow to act to the effects of migrations because they are unaware of such migrations until problems arise from such migrations. Local governments and civic institutions tend to react to problems instead of preparing for them.

One approach for determining a flow of people from one region to another relies on a relatively small volume of data from surveys or reports. However, conducting surveys not only requires significant human effort and time, but is also error prone and the responses are often untrustworthy.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for determining historical talent flow and/or predicting future talent flow. Determining or predicting talent flow is based on analyzing entity profiles and/or online activities of multiple entities. For example, a set of entity profiles is analyzed to determine how many entities moved to a particular region and the same or different set of entity profiles is analyzed to determine how many entities moved from the particular region. Such a historical analysis may be used to predict future talent flow patterns. Machine learning techniques may be used to generate a prediction model based on historical talent flow information.

Additionally or alternatively, talent flow may be represented as skills that are leaving a first geographic region and/or moving into a second geographic region.

Talent flow is important for cities, municipalities, states, and countries in establishing tax policy, education policy, housing policy, transportation policy, etc. For example, city officials may appreciate that a net flow of certain talent will cause an increase in housing prices and put further strain on already-congested roads. With such information, governments and other organizations are empowered to make better, more informed decisions in planning for migrations instead of simply reacting to them.

System Overview

Figure 1:
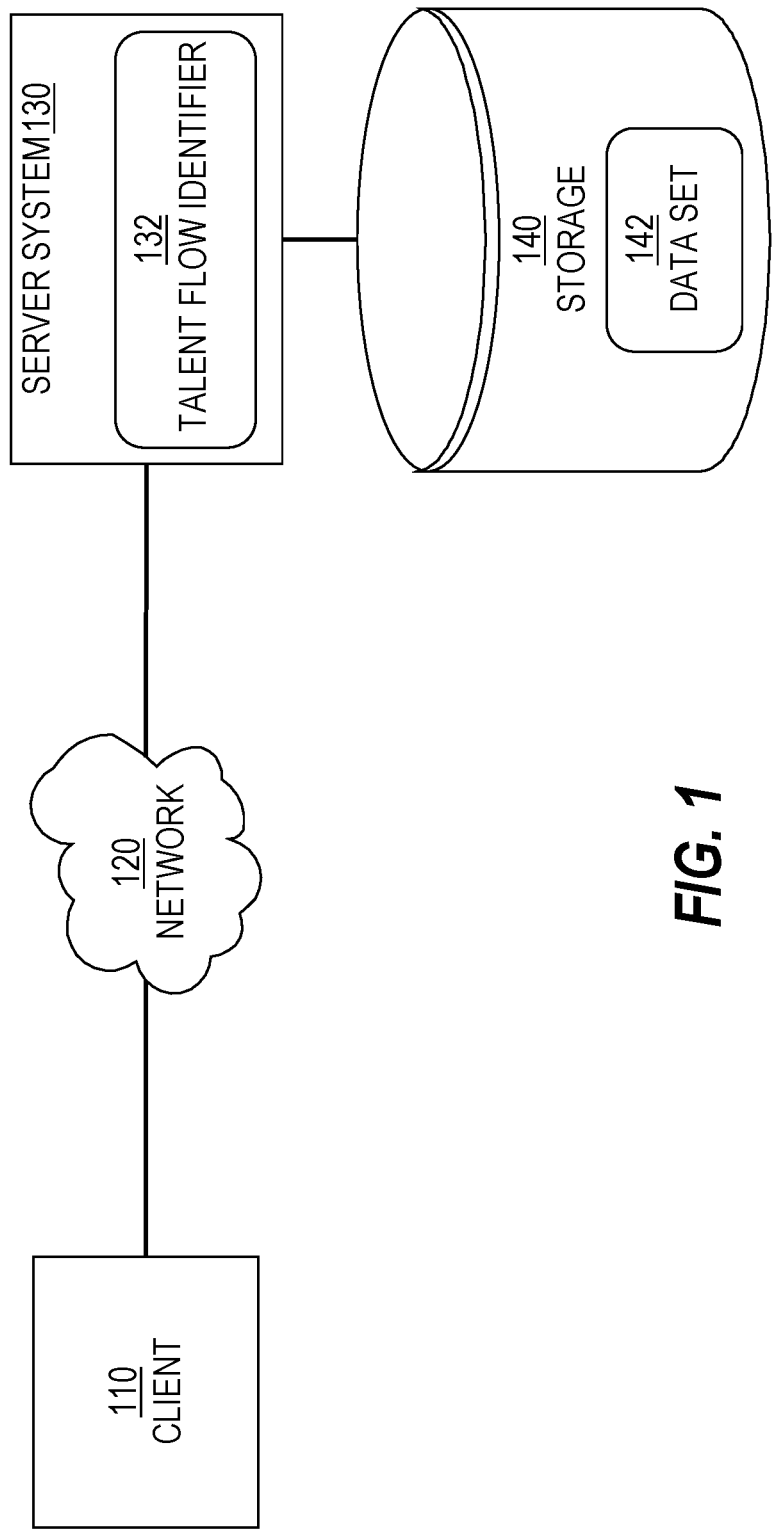
FIG. 1 is a block diagram that depicts a system for determining talent flow, in an embodiment.

FIG. 1 is a block diagram that depicts a system 100 for determining talent flow, in an embodiment. System 100 includes client 110, network 120, server system 130, and storage 140.

Client 110 is an application or computing device that is configured to communicate with server system 130 over network 120. Examples of computing devices include a laptop computer, a tablet computer, a smartphone, a desktop computer, and a Personal Digital Assistant (PDA). An example of an application includes a dedicated application that is installed and executed on a local computing device and that is configured to communicate with server 130 over network 120. Another example of an application is a web application that is downloaded from server system 130 and that executes within a web browser executing on a computing device. Client 110 may be implemented in hardware, software, or a combination of hardware and software. Although only a single client 110 is depicted, system 100 may include multiple clients that interact with server system 130 over network 120.

Through client 110, a user is able to provide input that includes profile information about the user. Later, the user may interact with server 130 to retrieve, supplement, and/or update the profile information.

Network 120 may be implemented on any medium or mechanism that provides for the exchange of data between client 110 and server system 130. Examples of network 120 include, without limitation, a network such as a Local Area Network (LAN), Wide Area Network (WAN), Ethernet or the Internet, or one or more terrestrial, satellite or wireless links.

Storage 140 stores a data set 142 from which cognates are identified. Storage 140 may comprise persistent storage and/or volatile storage. Storage 140 may comprise multiple storage devices. Also, although depicted separately from server system 130, storage 140 may be part of server system 130 or may be accessed by server system 130 over a local network, a wide area network, or the Internet.

Server System

As depicted in FIG. 1, server system 130 includes a talent flow identifier 132 that determines, based on data set 142 that is stored in storage 140, inflows and/or outflows of users and/or skills.

In an embodiment, data set 142 comprises multiple entity (or user) profiles, each provided by a different entity (or user). In this embodiment, server system 130 maintains accounts for multiple users. Server system 130 may provide a web service, such as a social networking service. Examples of social networking service include Facebook, LinkedIn, and Google+. Although depicted as a single element, server system 130 may comprise multiple computing elements and devices, connected in a local network or distributed regionally or globally across many networks, such as the Internet. Thus, server system 130 may comprise multiple computing elements other than talent flow identifier 132.

A user's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network.

Some data within a user's profile (e.g., work history) may be provided by the user while other data within the user's profile (e.g., skills and endorsement) may be provided by a third party, such as a "friend" or connection of the user or a colleague of the user.

Before data set 142 is analyzed, server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

Region

A region is a geographic region that may be defined based on a political boundary (e.g., a country, province, or state), a municipal boundary (e.g., a city, county, township, or group of cities, such as "Silicon Valley"), or physical boundaries, such as an island or a valley bounded by particular mountains. A region may be a collection of regions.

Talent Flow

"Talent flow" refers to the movement of people and/or their corresponding skills from and/or to a region. An amount of talent flow is bounded by a time period, such as the last week, the last three months, the last year, or a particular time period in the past (e.g., 2017) that does not take into account the most recent talent flow.

"Talent inflow" refers to movement of people/skills to a region and "talent outflow" refers to movement of people/skills from a region. An individual's movement from one region to another may be referred to as a "region change."

In an embodiment, talent flow identifier 132 predicts future talent flow for one or more regions. For example, a number of people who are likely to move to a first region ("predicted talent inflow") is determined. As another example, a number of people who are likely to move from a second region ("predicted talent outflow") is determined. Techniques for predicting talent flow are described herein.

In an embodiment, talent flow identifier 132 (or another component of server system 130) determines or calculates historical talent flow for one or more regions. For example, a number of people who moved to a first region ("historical talent inflow") is determined. As another example, a number of people who moved to a second region ("historical talent outflow") is determined.

In an embodiment, both talent inflow and talent outflow are determined for a particular region. With both talent inflow and talent outflow for a particular region, a "net talent flow" can be determined by subtracting (1) talent outflow (from the particular region) from (2) talent inflow (to the particular region). Thus, if talent inflow to a region is greater than talent outflow from the region, then that region experiences a net talent inflow. Conversely, if talent outflow from a region is greater than talent inflow to the region, then that region experiences a net outflow. Regions with relatively high positive net inflow will experience an increase in demand for services, such as housing, food, education, transportation, and/or utilities.

Historical Talent Flow

Historical talent flow may be determined in a number of ways. Historical talent flow may be determined (e.g., by talent flow identifier 132) from changes in user profiles maintained by server system 130. Additionally or alternatively, third party sources may be accessed to determine talent flow or to supplement talent flow data derived from the user profiles.

For example, user profiles change over time, such as adding skills and changing a job title, a job function, a geographic location, or an employer. If a first version of a user profile indicates that the user resided in region A prior to time 1 (e.g., a particular day, week, month, or year) and a second version of the user profile indicates that the user resided in region B after time 1, then talent inflow to region B is incremented and talent outflow from region A is incremented.

In a related example, some users may not specify a geographic location in which they live or work. However, an identity of an employer may be used to determine (e.g., by talent flow identifier 132) a region in which the user resides. If a user's employer has offices in multiple locations, then other information in the user's profile may be used to derive a region, such as user profiles of connections of the user, particularly user profiles of work associates of the user.

In the example above regarding regions A and B, if the time period being considered for talent flow includes time 1, then the appropriate talent flow numbers are incremented (e.g., by talent flow identifier 132); otherwise, no talent flow numbers are incremented based on that user. Thus, for a first inflow report for region B that includes time 1, that user's region change is accounted for, but for a second inflow report for region B that does not include time 1, that user's region change is not accounted for.

Changing employers by itself may or may not reveal an actual region change. For example, a user may move from an employer's office in region A to another office of the employer (or even a different employer) in region B. Thus, considering only employer changes in the user's profile will not reveal such a region change. If the user specifies a current geographic location in his/her profile, then any changes to that data field may trigger incrementing an inflow counter and/or an outflow counter. Some users might update, in their respective profiles, an employer name but not residence information whereas other users might update, in their respective profiles, residence information but not employer name. In an embodiment, if either type of change is detected in a user profile, then corresponding inflow/outflow counters are incremented.

For each user that is part of a region change, one or more person counters are incremented and, optionally, decremented, depending on an implementation. For example, each region may be associated with a person counter. If it is determined that a first person moved to region A, then a person counter is incremented; if it is determined that a second person moved away from region A, then the person counter is decremented. Alternatively, two person counters are maintained for each region: one for inflows and one for outflows. Thus, both counters are incrementing. Maintaining two counters for each region provides more granularity since it can be determined whether there is a lot of churn for a region. Otherwise, if only a single counter is maintained for region, then the magnitude of inflows and outflows of people is lost.

In an embodiment, each region change results in two counters being incremented. For example, if a person moves from region A to region B, then an outflow counter for region A is incremented and an inflow counter for region B is incremented. As another example, if a person moves from region A to region B, then a person counter for region A is decremented and a person counter for region B is incremented.

Skills Flow

As noted above, skill movement is another measure of talent flow. Each person that moves from region A to region B represents a gain of skills to region B and a loss of skills to region A. The skills related to user's region change may be determined (e.g., by talent flow identifier 132) by identifying skills in that user's profile. A user profile may specify one or more skills. In cases where a user's profile specifies few or no skills, other information may be analyzed to determine one or more skills associated with the user. For example, a job title or job listing may be associated with skills.

As a specific example, a first job title of a user is associated with a first pre-defined set of skills and a second job title of the user is associated with a second set of pre-defined set of skills. If the second set of pre-defined skills includes one or more particular skills that are not found in the first pre-defined set of skills or in skills specified in the user's profile, then those one or more particular skills are associated with the region change.

As another specific example, a job listing (e.g., posted by the employer offering the corresponding job position) specifies one or more particular skills that are required for the job position. If the user accepts the job position, then those one or more particular skills are associated with the region change, even though the one or more particular skills might not be specified in the user's profile.

For each user that is part of a region change, the skills of that user are determined and corresponding skill counters are incremented (e.g., by talent flow identifier 132) and, optionally, decremented, depending on an implementation. For example, each region may be associated with multiple skill counters, each skill counter corresponding to a different skill. If a skill is part of an inflow, then a corresponding skill counter is incremented; if the skill is part of an outflow, then the corresponding skill counter is decremented. Alternatively, two skill counters are maintained for each skill: one for inflows and one for outflows. Thus, both counters are incrementing. Maintaining two counters for each skill provides more granularity since it can be determined whether there is a lot of movement with respect to a particular skill. Otherwise, if only a single counter is maintained, then the magnitude of inflows and outflows is lost.

Example Process

Figure 2:
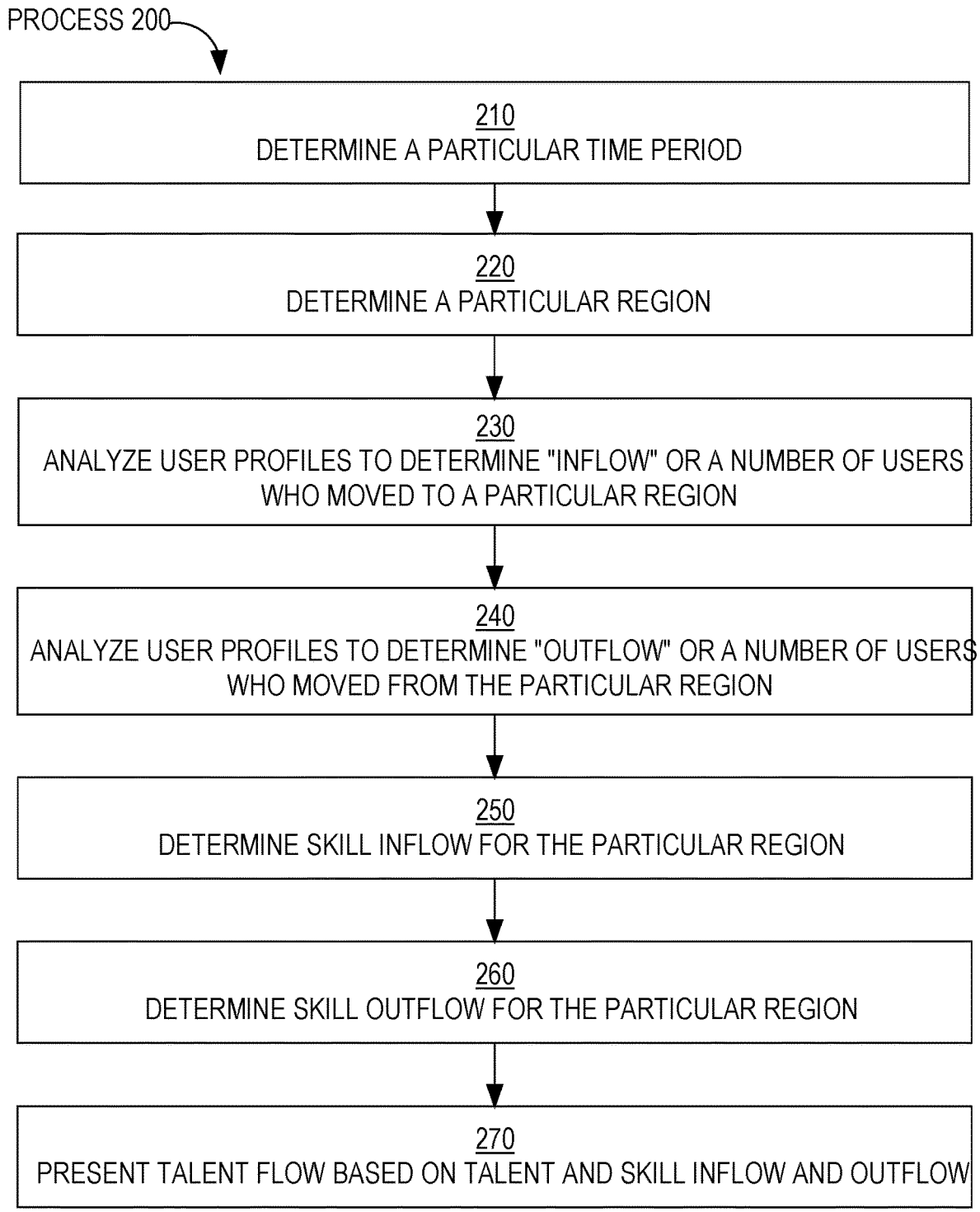
FIG. 2 is a flow diagram that depicts a process for calculating talent flow, in an embodiment.

FIG. 2 is a flow diagram that depicts a process 200 for calculating talent flow, in an embodiment. Process 200 may be implemented by talent flow identifier 132. Process 200 may be performed automatically and periodically, such as every day or every week. Additionally or alternatively, process 200 may be performed in response to user input.

At block 210, a particular time period is determined. The particular time period may be established based on user input that selects, specifies, or otherwise indicates the particular time period, such as the second quarter of 2016. Alternatively, the particular time period may be a default time period, such as the most recent three months.

At block 220, a particular region is determined. The particular region may be established based on user input that selects, specifies, or otherwise indicates the particular region. Alternatively, the particular region may be a default region. For example, process 200 may be performed every day or every week for each region of multiple possible regions.

At block 230, user profiles are analyzed to determine a number of users who moved to the particular region. Thus, block 230 is about determining inflow to the particular region. Block 230 may involve identifying a set of user profiles that indicate that the corresponding users resided or worked in the particular region during the particular time period and determining, for each user profile in the set, whether a previous version (or the current version) of the user profile indicates that the corresponding user previously resided or worked in another region (i.e., that is different than the particular region). For example, a user profile may indicate that a prior job position was located in region A during the particular time period and that a current job position is at region B (i.e., the particular region) during the particular time period.

At block 240, user profiles are analyzed to determine a number of users who moved from the particular region. Thus, block 240 is about determining outflow from the particular region. Block 240 may involve identifying a set of user profiles that indicate that the corresponding users resided or worked in the particular region during the particular time period and determining, for each user profile in the set, whether a current version of the user profile indicates that the corresponding user later resided or worked in another region (i.e., that is different than the particular region). For example, a user profile may indicate that a prior job position was located in region A (i.e., the particular region) during the particular time period and that a current job position is at region B during the particular time period.

At block 250, skill inflow is determined for the particular region during the particular time period. Block 250 may involve, for each user that moved to the particular region during the particular time period (determined in block 230), identifying skills indicated by the user profile of that user, whether specified explicitly or indicated implicitly based on past and/or current job titles and/or based on job postings that the user might have viewed, applied for, and was accepted. A skill counter may be associated with each skill and incremented for each user profile that indicates the skill.

At block 260, skill outflow is determined for the particular region during the particular time period. Block 260 may involve, for each user that moved from the particular region during the particular time period (determined in block 240), identifying skills indicated by the user profile of that user, whether specified explicitly or indicated implicitly. A skill counter may be associated with each skill and decremented (if the same skill counter is used for skill inflow) or incremented (if the skill counter is different than the skill counter used for skill inflow) for each user profile that indicates the skill.

At block 270, talent flow data is presented based on the talent and skill inflow and outflows determined. For example, talent inflow, talent outflow, skill inflow, and skill outflow is displayed for the particular region. Additionally or alternatively, block 270 involves determining a net talent flow for the particular region (based on the talent inflow and the talent outflow) and/or determining a net skill flow for the particular region (based on the skill inflow and the skill outflow).

Talent Flow Visualization

Figure 3:
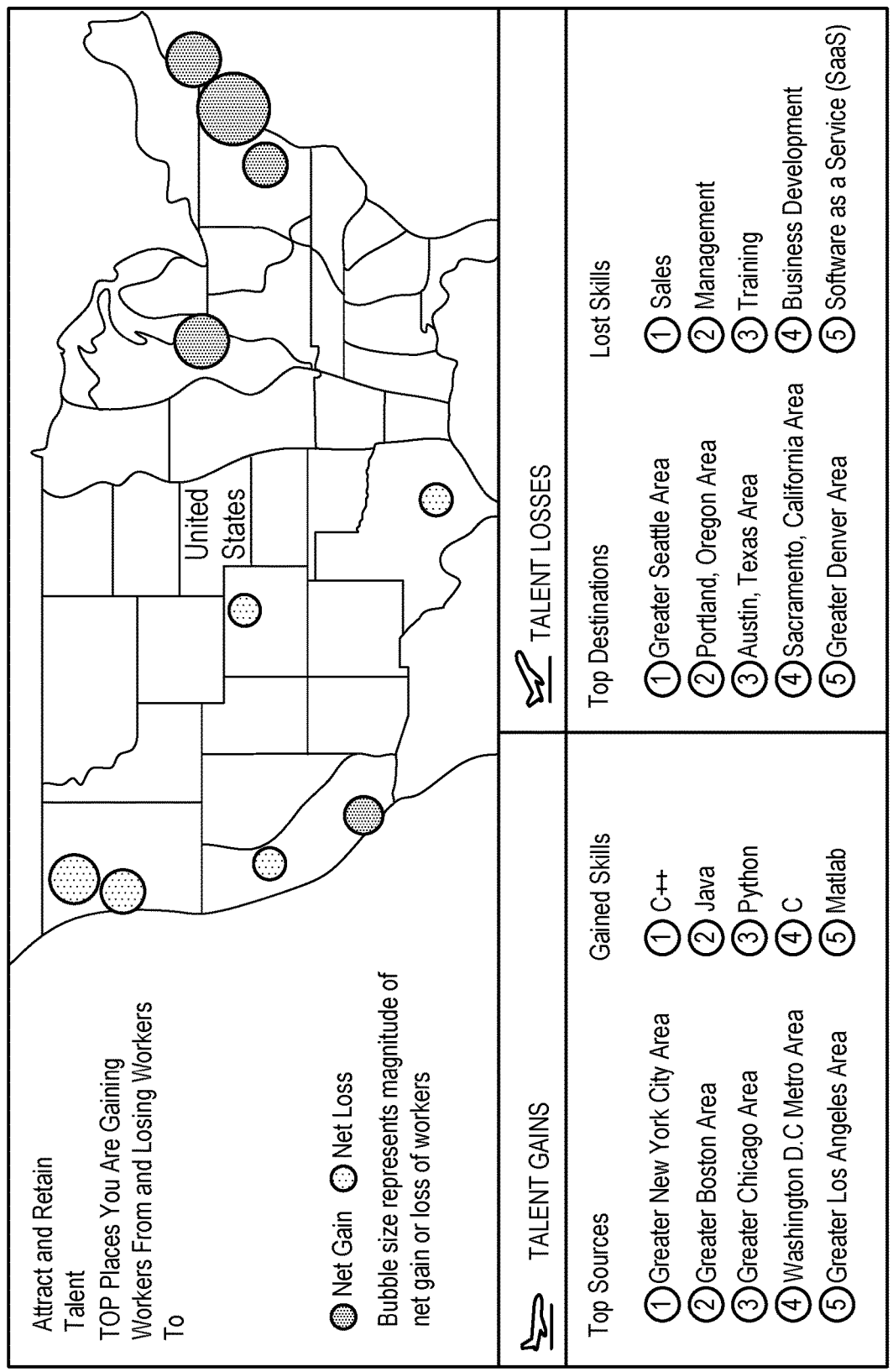
FIG. 3 is an example chart that depicts a map showing inflows to and outflows from a particular region, in an embodiment.

FIG. 3 is an example chart 300 that depicts a map showing inflows to and outflows from a particular region, in an embodiment. Chart 300 may be generated based on analyzing user profiles or other sources for region changes that occurred during a particular period of time (e.g., the last six months).

The map of chart 300 is of the United States. The more densely shaded circles show regions where people coming to the Bay Area are from (net inflow) and the less densely shaded circles show regions where people from the Bay Area are moving to (net outflow). The size of each circle indicates a magnitude of the net gain or net loss of people. For example, the greatest net inflow to the Bay Area is from the greater New York City area and the greatest net outflow from the Bay Area is to the greater Seattle area.

In an embodiment, a user interface (e.g., generated by server system 130) includes one or more graphical elements that allow a user to select or specify other geographic regions. For example, a French government official may select the city of Paris and, as a result, is presented with talent flow (1) to Paris from other regions within France (and potentially from other countries) and (2) from Paris to other regions within France (and potentially to other countries). Then, the official may select Lyon and, as a result, is presented with talent flow (1) to Lyon from other regions within France (and potentially from other countries) and (2) from Lyon to other regions within France (and potentially to other countries).

In a related embodiment, the user interface allows a user to select two different regions: a first region and a second region. As a result, inflow to the first region from the second region is determined and displayed and inflow to the second region from the first region is determined and displayed.

In an embodiment, a map is automatically updated to depict talent flow over time. For example, one instance of a map shows talent flow with respect to a particular region during Q1 of 2017 while a subsequent instance of the map shows talent flow with respect to the particular region during Q2 of 2017. If the magnitude of inflows and outflows is depicted with the size or color of circles (each circle corresponding to a different region), then iteratively showing multiple instances of the map will give the appearance of changes in the size or color of the circles. Thus, changes in the size or color of circles indicates (1) changes in outflows from the particular region to other regions and (2) changes in inflows from other regions to the particular region.

SALARY

In an embodiment, each person that moves from one region to another is associated with compensation information. Different job titles or job functions may be associated with a particular salary or a range of compensation. Additionally or alternatively, each job title or job function is classified into one of multiple pre-defined categories, such as high paying, medium paying, and low paying.

Using compensation information, weights may be added to the talent flow data. For example, the size of a circle in a chart (e.g., similar to chart 200) may also be based on compensation information. For example, if: (1) region A and region B have net outflows to region C; (2) the net outflows are identical (or near identical); but (3) the salaries of people from region A are on average larger than the salaries of people from region B, then a circle for region A would be larger than a circle for region B.

Talent Flow Aggregation Across Regions

In an embodiment, talent flow may be aggregated across regions. For example, talent flow with respect to region A and talent flow with respect to region B is combined to generate an aggregated talent flow with respect to regions A and B. Thus, talent inflow to region A is combined with talent inflow to region B and talent outflow from region A is combined with talent outflow from region B.

Predicting Talent Flow

In an embodiment, talent flow is predicted in the future based on historical talent flow. For example, talent inflow to a particular region may be predicted and talent outflow from the particular region may be predicted. Multiple factors may be considered when predicting talent flow. Example user-centric factors include:
  a. a user "following" an organization/company in a particular region (referred to as "a company follow"), which means that the user will receive electronic notifications from or about the organization
  b. a user "liking" an organization in a particular region
  c. a user establishing a connection with an employee at an organization in a particular region
  d. a user sending a message to an employee at an organization in a particular region
  e. a user requesting a view of an organization in a particular region (referred to as a "company page view")
  f. a user requesting a view of a job posting associated with a job position in a particular region (referred to as a "job view")
  g. a user applying to a job position offered by an organization in a particular region (referred to as a "job application")
  h. a user requesting a view of a profile of another user affiliated with (e.g., employed by) an organization in a particular region (referred to as a "profile view")
  i. a user performing a person search or job search and selecting, in results of the search, a person listing or job posting associated with a particular region
  j. a user adding a skill to his/her user profile
  k. a user receiving an endorsement to his/her profile
  l. a user adding, to his/her profile, education information of an academic institution that is located in a particular region
  m. a user adding certification information of one or more certifications available in a particular region
  n. a user joining an online group that is dedicated to employment opportunities in a particular region
  o. a number of a user's connections that have moved to a particular region (if a significant percentage of a user's connections move to a particular region, then it might increase the likelihood that the user also moves to the particular region
  p. a user updating other aspects of his/her profile, such as work experience or work summary The above example factors are based on online user activities. Examples of non-activity user-centric factors include languages listed for a user and prior work experience related to an organization in a region. A language may be determined for a user by analyzing the user's profile or other online activity. For example, a user may list one or more languages in his/her profile. As another example, a user may post or provide a comment in a particular language. As another example, a user may request or view content in a particular language, indicating that the user is at least proficient in that language.

Regarding language as a user-centric factor, if a first user knows a language associated with a particular language and a second user does not, then, all else being equal, the first user is more likely to move to a region that is associated with the particular language.

Regarding work experience as a user-centric factor, if a first user has worked in a particular region in the past and a second user has not, then, all else being equal, the first user is more likely to move to the particular region.

Other example factors may include multiple instances of a particular factor. For example, a user that sends three electronic messages to one or more employees at one or more organizations in a region is a significant predictor of movement to that region, whereas only one or two messages is not a significant predictor. As another example, a user that applies to two different job positions in a region is a significant predictor of movement to that region, whereas only one job application is not a significant predictor. As another example, a user that initiates ten job views a region is a significant predictor of movement to that region, whereas over ten job views is a negative predictor (for example, because such a large number of job views may indicate that the user is a recruiter or in a recruiter role).

Other example factors may include a combination of multiple factors. For example, a job view of a job positing associated with a region followed by a job application to the job position may be a significant predictor of movement to that region, whereas only a job view or even multiple job views may be an insignificant predictor or a negative predictor of movement to that region. As another example, a company page view of a particular organization in a region followed by a new connection to an employee at the particular organization, followed by multiple electronic messages to the employee is a significant predictor of movement to that region.

Region-Centric Factors

Factors independent of user activity may be considered when determining whether a user will move from one region to another. Such factors are referred to herein as region-centric factors. Examples of region-centric factors include:
  a. a number of job openings in a region
  b. overall cost of living of a region
  c. an amount, level or rate of taxes associated with a region (e.g., including state and local taxes)
  d. quality (e.g., reflected in publicly-available ratings) of public schools in a region
  e. quality of public utilities (e.g., water, electricity, gas) in a region
  f. cost of public utilities in a region
  g. quality of other public services (e.g., trash, recycling, library, transportation) in a region
  h. recent social media sentiment about a region i. news about major organizations (e.g., companies, government agencies) establishing new offices in a region The data for some of these factors may be derived from third-party sources, such as published government statistics or statistics from trusted private entities.

Additionally or alternatively to the above-listed region-centric factors are differences between a region-centric factor of one region and a corresponding region-centric factor of another region. For example, if an amount of taxes in region A is greater than an amount of taxes in region B, then, all else being equal, a user is more likely to move from region A to region B. As another example, if quality ratings of public schools in region A is greater than quality ratings of public schools in region B, then, all else being equal, a user is less likely to move from region A to region B.

Additionally or alternatively to the above-listed region-centric factors are recent changes in a region-centric factor. For example, if an amount of taxes in region A is X and later becomes X+Y, then, all else being equal, a user is more likely to move from region A. As another example, if quality ratings of public schools in region A has increased recently, then, all else being equal, a user is less likely to move from region A.

Another example region-centric factor includes whether a region is associated with visa restrictions or a type of a visa restriction. Some visa restrictions are more restrictive than others. For example, some countries may ban immigrants from certain countries while other countries may have a laborious and/or time-consuming visa process that may dissuade some people (at least at the margins) from migrating to those countries. Visa restrictions may be considered only for users who reside in one country and are being considered for movement to another country.

Predicting Per User

In an embodiment, talent flow is predicted on a per-user and per-region basis. For example, each user of multiple users is analyzed to determine how likely the user is to move to a particular region. (The users that are considered do not include users that already reside in the particular region.) Thus, activities of a million users may be analyzed to predict whether each user will move to the particular region. Then, for a different region, activities of the same million users (except for users that already reside in the different region, plus users that reside in the particular region) may be analyzed to predict whether each user will move to the different region.

As another example, each user of multiple users who reside in a first region is analyzed to determine how likely the user is to move from the first region. Later, activities users who reside in a second region may be analyzed to predict whether each user will move from the second region. If there is overlap in the first and second regions (e.g., the first region is within the second region), then some users may be considered for both the first region and the second region.

The output of each prediction may be a probability (e.g., if a machine-learned prediction model is used), a binary classification (e.g., will move or will not move), or a number that may be mapped to a probability or range of probabilities. If the output of each prediction is a probability, then the probabilities may be added and divided by the number of users whose activities were analyzed in order to determine a number of users who are predicted to move from the corresponding region. If the output of each prediction is a binary classification, then the positive outputs are totaled to determine a number of users who are predicted to move from the corresponding region.

In an embodiment, the pool of users who are considered for movement from one region to another region are limited. For example, if a particular inflow region is in the United States, then users that reside outside the United States or outside North America are not considered. As another example, if a particular inflow region is in Germany, then users that reside outside of Europe are not considered.

In a related embodiment, a user interface allows a user to select two different regions: a first region and a second region. As a result, predictions are made (or determined) for users that reside in both regions: a prediction for each user that resides in the first region will move to the second region and a prediction for each user that resides in the second region will move to the first region. In this way, if it is already known that there has been significant talent flow between two regions, detailed information about the skills of both groups may be viewed.

Rule-Based Prediction Model

Predicting talent flow may be performed in a number of ways. For example, rules may be established that count certain activities and profile changes for each user, each count corresponding to a different score and, based on a combined score, determine whether the user will move from one region and/or move to another specific region. For example, a user "following" a company online may result in three points, the user establishing one or more connections with employees at one or more companies in a particular region may be result in five points (bringing the total to eight points), and the user sending multiple messages to those employees may result in ten points (bringing the total to eighteen points). If a user reaches twenty points, then it is predicted that the user will move to the particular region.

Rules may be determined manually by analyzing characteristics of users who moved from one region to another region. For example, it may be determined that 56% of users who made a new connection to an employee of an organization in a region, sent multiple messages to the new connection, and applied to multiple job positions associated with the region ultimately moved to that region.

A rule-based prediction model has numerous disadvantages. One disadvantage is that it fails to capture nonlinear correlations. For example, if a user requests many company page views, then the user will receive a high movement score, since the user accumulates, for example, five points for each company page view. However, there may be diminishing returns for each company page view after a certain number. The most likely users may request, for example, between five and eight company page views. Requesting company page views past this may not indicate a significant probability of moving regions. In fact, it may even be the case that requesting many company page views is a negative signal. For example, such behavior could indicate the behavior of a student or recruiter who is researching a broad swatch of companies. In addition, complex interactions of features cannot be represented by such rule-based prediction models.

Another issue with a rule-based prediction model is that the hand-selection of values is error-prone, time consuming, and non-probabilistic. Hand-selection also allows for bias from potentially mistaken business logic.

A third disadvantage is that output of a rule-based prediction model is an unbounded positive or negative value.

The output of a rule-based prediction model does not intuitively map to the probability of region movement. In contrast, machine learning methods are probabilistic and therefore can give intuitive probability scores.

Machine-Learned Prediction Model

In an embodiment, one or more prediction models are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users and regions. The statistical model is trained based on multiple attributes (or factors) described herein. In machine learning parlance, such attributes are referred to as "features." To generate and train a statistical prediction model, a set of features is specified and a set of training data is identified.

Embodiments are not limited to any particular machine learning technique for generating a prediction model. Example machine learning techniques include linear regression, logistic regression, random forests, naive Bayes, and Support Vector Machines (SVMs). Advantages that machine-learned prediction models have over rule-based prediction models include the ability of machine-learned prediction models to output a probability (as opposed to a number that might not be translatable to a probability), the ability of machine-learned prediction models to capture non-linear correlations between features, and the reduction in bias in determining weights for different features.

A machine-learned prediction model may output different types of data or values, depending on the input features and the training data. For example, training data may comprise, for each user, multiple feature values, each corresponding to a different feature. Example features include the factors described previously. In order to generate the training data, information about each user is analyzed to compute the different feature values. In this example, the dependent variable of each training instance may be whether the user moved from his/her current region. Additionally or alternatively, the dependent variable of each training instance may indicate a region to which the user moved (if the user did move).

In the embodiment where a machine-learned prediction model predicts only whether a user will move from his current region, further analysis may be made to determine which region the user is likely to move to. Such further analysis may be performed by a component that analyzes historical online activity of the user who is predicted will move and determines, for example, the location of companies the user started to follow, the location of new connections that the user made, the location of organizations to which the user applied, etc.

In these examples, the machine-learned prediction model operates at the individual user level, making a prediction for each user whose corresponding feature values are input to the model. As will be described in further detail below, another machine-learned prediction model operates at the region level, taking into account region-level characteristics and outputting a number of users that will migrate to a particular region or from a particular region.

In the prediction per-user scenario, the training data may include negative instances of region movement, each corresponding to a user that did not change regions or did not move to a particular region. The training data may be ensured to include at least a certain percentage of negative instances, such as 30% or 50% of all training instances in the training data.

Initially, the number of features that are considered for training may be significant. After training a prediction model and validating the prediction model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features will little predictive power may be removed from the training data. Removing such features can speed up the process of training future prediction models and making predictions.

Predicting on a Per-Region Basis

In an embodiment, instead of predicting whether individual users will move from region A and/or will move to region B, a prediction model is generated that makes a direct prediction about the number of individuals that will move to a region or from a region. Such a prediction model (whether rule-based or machine-learned) takes into account region-level factors. Region-level factors may include the region-centric factors described previously as well as user-related factors, such as:

a. a number of users (who reside or work outside a particular region) who "followed" an organization located in the particular region
b. a number of users (who reside or work in a particular region) who "followed" an organization located outside the particular region
c. a number of users (who reside or work outside a particular region) who "liked" an organization located in the particular region
d. a number of users (who reside or work in a particular region) who "liked" an organization located outside the particular region
e. a number of users (who reside or work outside a particular region) who established new connections with individuals who reside or work in the particular region
f. a number of users (who reside or work in a particular region) who established new connections with individuals who reside or work outside the particular region
g. a number of users (who reside or work outside a particular region) who sent messages to employees of organizations located in the particular region
h. a number of users (who reside or work in a particular region) who sent messages to employees of organizations located outside the particular region
i. a number of users (who reside or work outside a particular region) who requested company page views of organizations located in the particular region
j. a number of users (who reside or work in a particular region) who requested company page views of organizations located outside the particular region
k. a number of users (who reside or work outside a particular region) who requested job views of job positions associated with the particular region
l. a number of users (who reside or work in a particular region) who requested job views of job positions associated with another region m. a number of users (who reside or work outside a particular region) who applied to job positions offered by organizations that are located in the particular region
n. a number of users (who reside or work in a particular region) who applied to job positions offered by organizations that are located outside the particular region
o. a number of users (who reside or work outside a particular region) who requested profile views of users who reside or work in the particular region
p. a number of users (who reside or work in a particular region) who requested profile views of users who reside or work outside the particular region
q. a number of users (who reside or work outside a particular region) who initiated a person search or job search and subsequently selected, in results of the search, a person listing or job posting associated with the particular region
r. a number of users (who reside or work in a particular region) who initiated a person search or job search and subsequently selected, in results of the search, a person listing or job posting associated with a different region
s. a number of users (who reside or work in a particular region) who have added skills to their respective profiles (which is a signal that there will be movement from the particular region)
t. a number of users who reside or work in a particular region who have received endorsements to their respective profiles (which is a signal that there will be movement from the particular region)
u. a number of users who reside or work in a particular region who have updated other aspects of their respective profiles, such as work experience or work summary (which is a signal that there will be movement from the particular region)

In a machine-learning context, training data includes, for each region, a set of region-level feature values. The dependent variable for each region may be (a) a number of users that moved to the region, (b) a number of users that moved from the region, or (c) a net flow of users that moved to and from the region. Some of the above-listed region-level factors may be used to predict (a) while other of the above-listed region-level factors may be used to predict (b).

Geographic-Specific Prediction Models

In an embodiment, multiple prediction models are generated (whether machine-learned or rule-based), each corresponding to a different geographic region. For example, one prediction model is generated for North America, another prediction model is generated for South America, another prediction model is generated for Western Europe, and another prediction model is generated for China. People from different continents, countries, or other geographic regions may exhibit different types and/or quantities of activities prior to movement from one region to another.

Example Prediction Process

Figure 4:
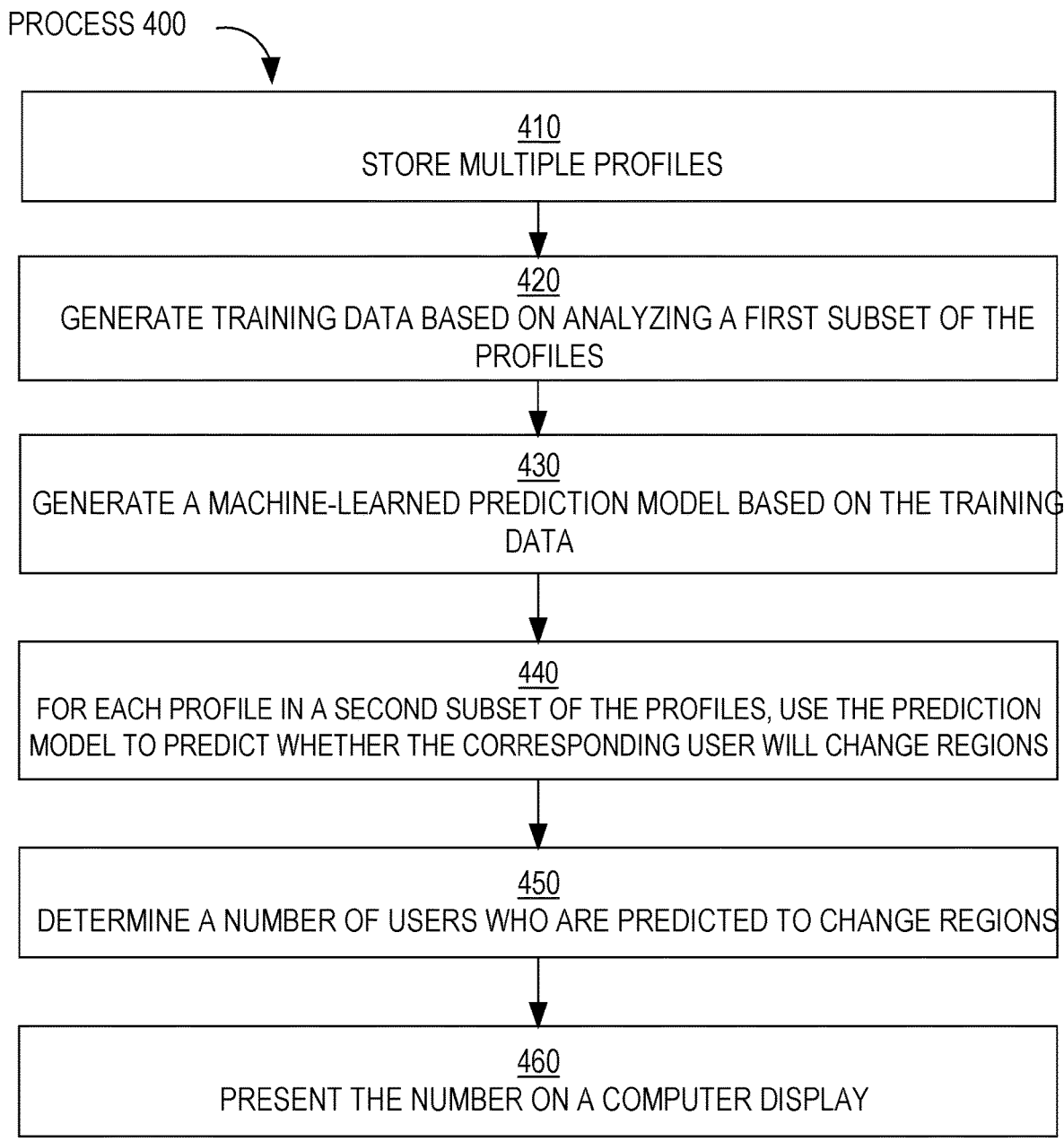
FIG. 4 is a flow diagram that depicts a process for predicting talent flow, in an embodiment.

FIG. 4 is a flow diagram that depicts a process 400 for predicting talent flow, in an embodiment. Process 400 may be implemented by server system 130.

At block 410, multiple user profiles are stored. Each user profile includes information about a user, such as online activity performed by or initiated by the user. The user profile may also include other information that the user has supplied, such as job title, employer name, and current residence information.

At block 420, training data is generated based on analyzing a first subset of the user profiles. The training data is labeled indicating whether a corresponding user has moved regions. Block 420 may involve, for each user corresponding to a user profile in the first subset, determining, for each of multiple features, a feature value based on the user profile and/or based on online activities performed by the user. The training data may also indicate (or associate) region-centric factors for each user.

At block 430, a machine-learned prediction model is generated based on the training data. One portion of the training data may be used to train or generate the prediction model while another portion of the training data may be used to validate the prediction model.

At block 440, for each user corresponding to a user profile in a second subset of the user profiles, the machine-learned prediction model is used to predict whether that user will move to another region or from the user's current region. If the prediction is whether the user will move to a particular region, then the second subset of the user profiles may be limited to user profiles that indicate that the corresponding users do not already reside or work in the particular region. Conversely, if the prediction is whether the user will move from a particular region, then the second subset of the user profiles is limited to user profiles that indicate that the corresponding users currently reside or work in the particular region.

At block 450, based on the predictions for users corresponding to the second subset of user profiles, a number of users who are predicted to move to another region or move from a current region is determined.

At block 460, the determined number of users are presented on a computer display. An example of such a presentation is chart 200 in FIG. 2.

Process 400 may also involve determining skills of the users who are predicted to move or change regions. Thus, data about skill inflow to a particular region and skill outflow from multiple regions may be displayed.

Example Prediction System

Figure 5:
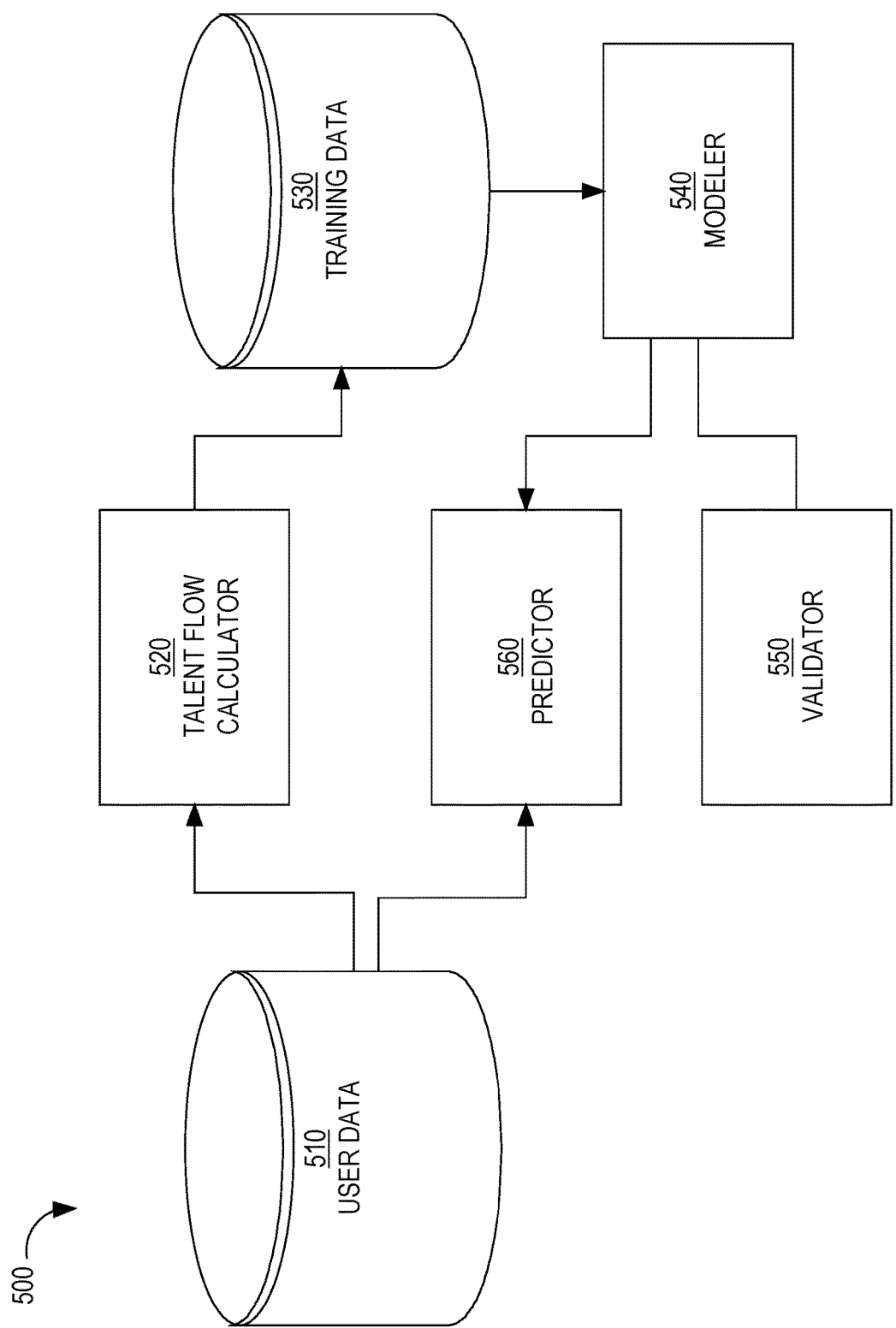
FIG. 5 is a block diagram that depicts an example prediction system for predicting talent flow, in an embodiment.

FIG. 5 is a block diagram that depicts an example prediction system 500 for predicting talent flow, in an embodiment. System 500 includes user data 510, talent flow calculator 520, training data 530, modeler 540, validator 550, and predictor 560. Talent flow calculator 520, modeler 540, validator 550, and predictor 560 are implemented in software, hardware, or any combination of software and hardware.

User data 510 includes data about each user of multiple users, the data including data about activities that each user performed online, such as applying for a job, viewing another user's profile, viewing a company page, sending messages to new (or existing) connections, etc. User data 510 also indicates, for each user, where the user resides or works, whether the user moved, and, if so, when and, optionally, where the user moved.

Talent flow calculator 520 analyzes user data 510 and generates training data 530. For example, a feature may be whether the user initiated more than three new connections during a particular time period. Thus, talent flow calculator 520 analyzes a user record that indicates connection activity for a particular user and makes the determination of whether the user initiated more than three new connections during the particular time period. If so, then a corresponding feature value is 1; otherwise, the corresponding feature value is 0. Talent flow calculator 520 includes a label for each training instance (in the scenario where the prediction is made on a per-user basis), the label indicating whether the corresponding user moved and, optionally, where the user moved to if the user did in fact move.

Talent flow calculator 520 may generate multiple sets of training data 530, each set corresponding to a different time period and used to generate a different prediction model.

Modeler 540 implements one or more machine-learning techniques to generate a prediction model based on training data 530, or at least a portion thereof.

Validator 550 validates the generated prediction model using a portion of training data 530, preferably a portion that was not used to generate the prediction model. Validator 550 determines an error rate of the prediction model. If the error rate is less than a particular threshold, then the prediction model is used to make predictions for users whose data may be reflected in user data 510 or whose data may be stored separately.

Technical Improvements

One approach for determining talent flow relies on a relatively small volume of data from surveys or reports. Embodiments described herein have one or more of the following advantages over this and prior approaches that consider talent flow. For example, embodiments involve analyzing a data set that is much larger in size and that is continually being updated without having to conduct surveys, which requires significant human effort and time. Therefore, results reflecting historical talent flow and generated using embodiments herein can be much more reliable.

Another advantage of some embodiments includes predicting the flow of talent and skill as opposed to simply showing "what happened." Machine learning techniques are utilized to obtain more valuable information from the large amount of user data, such as what user characteristics and online activities correlate with region change.

Another advantage of some embodiments includes a highly trusted conclusion based on the input of user data, which trust is possible because all (or most) of the data is provided by users within a social network. Considering their reputation in a public domain, professionals are less likely to post and do fraudulent things. This translates into high quality user-related data. Results of historical analysis and any predictive models can be much more reliable from the view of authenticity.

Another advantage of some embodiments includes a visualization and search tool that allows users to easily identify historical, current, and potential flow of talent among different regions.

Another advantage of some embodiments includes being able to weight a migration's impact on social economy (e.g., living costs) using explicit or implicit salary data. For example, users moving for relatively high paying jobs will have a higher impact on living costs than members moving for relatively low paying jobs.

As indicated previous, talent flow can have a significant impact on a region's cost of living, levels of vehicle traffic, use of transportation and hotels, tax base, educational resources, utility usage, etc. By understanding current and future talent flow, leaders within a region can better plan for changes that are happening and that will happen.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
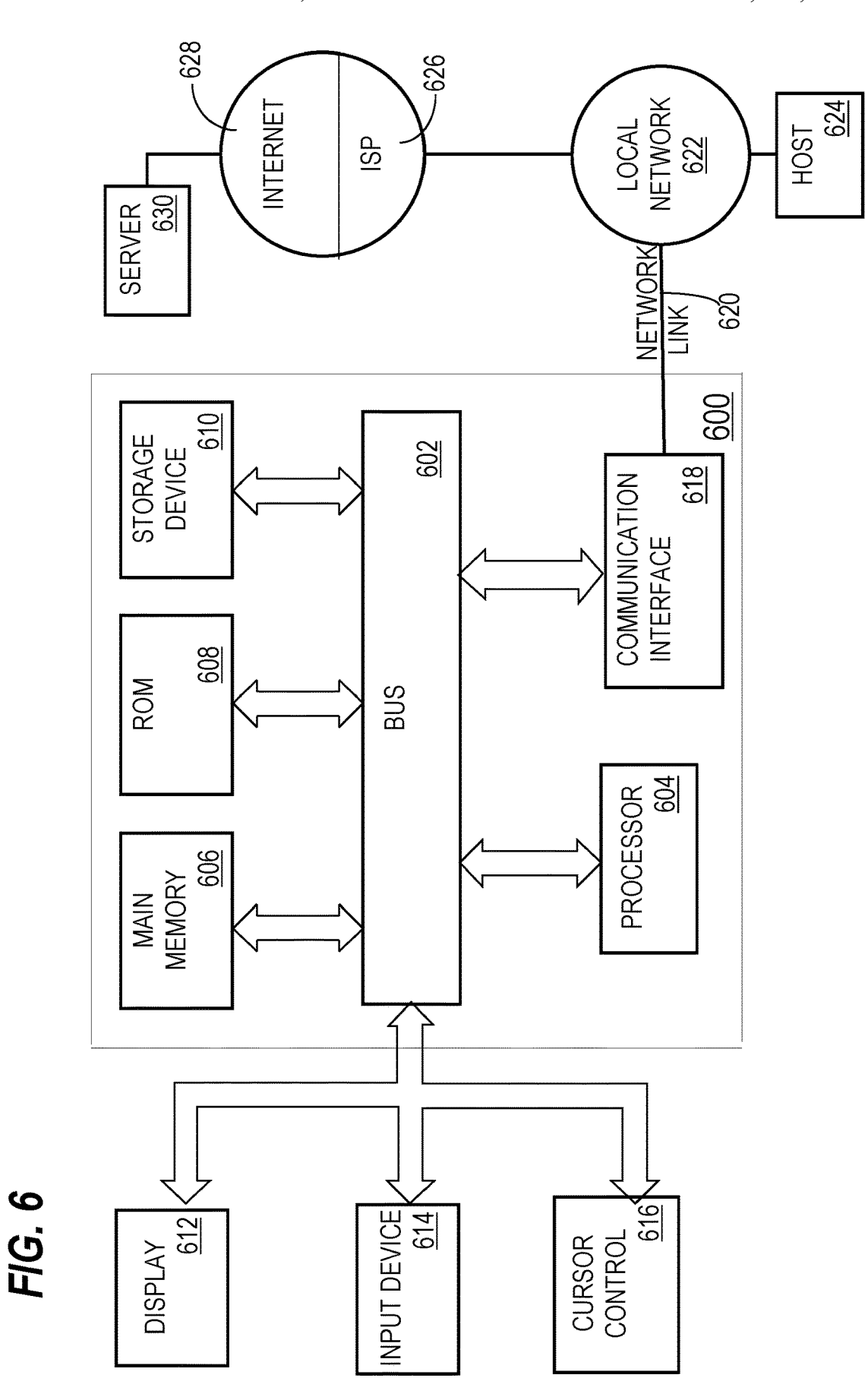
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a plurality of entity profiles;
   generating training data based on a first subset of the plurality of entity profiles, wherein at least a portion of the training data is labeled indicating whether a corresponding entity has moved to or moved from a region;
   generating a machine-learned prediction model based on the training data;
   using the machine-learned prediction model to predict whether, for each entity corresponding to an entity profile in a second subset of the plurality of entity profiles, said each entity will move to or move from a particular region;
   based on a plurality of predictions for entities corresponding to the second subset of entity profiles, determining a number of entities who are predicted to move to or move from the particular region;
   for each entity that is predicted to move to or move from the particular region:
     analyzing an entity profile of said each entity to identify one or more skills that are associated with said each entity; and
     for each skill of a plurality of skills, determining a total number of instances, in the multiple entity profiles, of said each skill; and
   causing talent flow data, based on the number of entities, and skill data, based on the total number of instances of at least one skill in the plurality of skills, to be presented on a computer display;
   wherein the method is performed by one or more computing devices.

2. The method of claim 1, wherein the number of entities are predicted to move to the particular region, the method further comprising:
   using the machine-learned prediction model to predict whether, for each entity corresponding to an entity profile in the second subset of the plurality of entity profiles, said each entity will move from the particular region;
   based on a second plurality of predictions for entities corresponding to the second subset of entity profiles, determining a second number of entities who are predicted to move from the particular region;

causing second talent flow data that is based on the second number of entities to be presented on the computer display.

3. The method of claim 2, further comprising:
for each entity that is predicted to move from the particular region:
analyzing an entity profile of said each entity to identify one or more skills that are associated with said each entity; and
for each skill of a plurality of skills, determining a total number of instances, in the multiple entity profiles, of said each skill; and
for a particular skill in the plurality of skills, determining a net skill flow for the particular skill;
wherein causing the skill data to be presented on the computer display comprises causing the net skill flow for the particular skill to be presented on the computer display.

4. The method of claim 1, wherein the number of entities are predicted to move from the particular region, the method further comprising:
based on the plurality of predictions:
determining a first number of entities that are predicted to move to a first region that is different than the particular region, wherein the first number of entities is a first subset of the number of entities;
determining a second number of entities that are predicted to move to a second region that is different than the first region and the particular region,
wherein the second number of entities is a second subset of the number of entities.

5. The method of claim 1, wherein the number of entities are predicted to move to the particular region, the method further comprising:
based on the plurality of predictions:
determining a first number of entities that are predicted to move from a first region that is different than the particular region, wherein the first number of entities is a first subset of the number of entities;
determining a second number of entities that are predicted to move from a second region that is different than the first region and the particular region,
wherein the second number of entities is a second subset of the number of entities.

6. The method of claim 1, wherein the machine-learned prediction model is based on a plurality of features, wherein the plurality of features includes one or more of: a number of organizations, in a certain region, that an entity has followed; a number of organizations, in the certain region, that the entity has liked; or a number of connections that the entity has established with other entities associated with the certain region.

7. The method of claim 1, wherein the machine-learned prediction model is based on a plurality of features, wherein the plurality of features includes one or more of: whether or a number of electronic messages that an entity has sent to employees of an organization in a certain region; whether or a number of requests by the entity of profiles of organizations in the certain region; whether or a number of requests by the entity of job postings associated with the certain region; whether or a number of applications by the entity to job openings offered by one or more organizations in the certain region; or whether or a number of requests by the entity to view profiles of other entities affiliated with one or more organizations in the certain region.

8. The method of claim 1, wherein the machine-learned prediction model is based on a plurality of features, wherein the plurality of features includes one or more of: whether or a number of times an entity has initiated a search and selected a search result that is associated with a certain region; the entity adding one or more skills to a profile of the entity; or the entity receiving an endorsement from another entity.

9. The method of claim 1, wherein the machine-learned prediction model is based on a plurality of user-related features and a plurality of region-centric features.

10. The method of claim 9, wherein the plurality of region-centric features includes one or more of: a number of job openings in a certain region; a cost of living in the certain region; an amount, level or rate of taxes associated with the certain region; a quality of public schools in the certain region; a quality of public utilities in the certain region; or a cost of public utilities in the certain region.

11. A method comprising:
storing a plurality of entity profiles;
based on a particular period of time:
analyzing a first subset of the plurality of entity profiles to determine a first number of entities that have moved to a particular region during the particular period of time;
analyzing a second subset of the plurality of entity profiles to determine a second number of entities that have moved from the particular region during the particular period of time;
causing data about the first number of entities and the second number of entities to be presented on a computer display;
for each entity corresponding to the first number of entities:
using an entity profile corresponding to said each entity to identify one or more first skills of said entity;
updating a skill inflow counter for each skill of the one or more first skills;
generating first skill data based on the skill inflow counter for each skill of the one or more first skills;
causing the first skill data to be presented on the computer display;
for each entity corresponding to the second number of entities:
using an entity profile corresponding to said each entity to identify one or more second skills of said entity;
updating a skill outflow counter for each skill of the one or more second skills;
generating second skill data based on the skill outflow counter for each skill of the one or more second skills;
causing the second skill data to be presented on the computer display;
wherein the method is performed by one or more computing devices.

12. One or more non-transitory storage media storing instructions which, when executed by one or more computing devices, cause:
storing a plurality of entity profiles;
generating training data based on a first subset of the plurality of entity profiles, wherein at least a portion of the training data is labeled indicating whether a corresponding entity has moved to or moved from a region;
generating a machine-learned prediction model based on the training data;
using the machine-learned prediction model to predict a first number of entities who will move to a particular region and a second number of entities who will move from the particular region;

for each entity that is predicted to move to the particular region, and for each entity that is predicted to move from the particular region:
analyzing an entity profile of said each entity to identify one or more skills that are associated with said each entity; and
for each skill of a plurality of skills, determining a total number of instances, in the multiple entity profiles, of said each skill; and
causing talent flow data, based on the first number of entities and the second number of entities, and skill data, based on the total number of instances of at least one skill in the plurality of skills to be presented on a computer display.

13. The one or more storage media of claim 12, wherein the instructions, when executed by one or more processors, further cause:
using the machine-learned prediction model to predict:
a first set of entities that are predicted to move from the particular region to a first region, wherein the first set of entities is a first strict subset of the entities that are predicted to move from the particular region, and
a second set of entities that are predicted to move from the particular region to a second region that is different than the first region, wherein the second set of entities is a second strict subset of the entities that are predicted to move from the particular region.

14. The one or more storage media of claim 12, wherein the instructions, when executed by one or more processors, further cause:
using the machine-learned prediction model to predict:
a first set of entities that are predicted to move from a first region to the particular region, wherein the first set of entities is a first strict subset of the entities that are predicted to move to the particular region, and
a second set of entities that are predicted to move from a second region to the particular region, wherein the second region is different than the first region, wherein the second set of entities is a second strict subset of the entities that are predicted to move to the particular region.

15. The one or more storage media of claim 12, wherein the machine-learned prediction model is based on a plurality of features, wherein the plurality of features includes one or more of: a number of organizations, in a certain region, that an entity has followed; a number of organizations, in the certain region, that the entity has liked; or a number of connections that the entity has established with other entities associated with the certain region.

16. The one or more storage media of claim 12, wherein the machine-learned prediction model is based on a plurality of features, wherein the plurality of features includes one or more of: whether or a number of electronic messages that an entity has sent to employees of an organization in a certain region; whether or a number of requests by the entity of profiles of organizations in the certain region; whether or a number of requests by the entity of job postings associated with the certain region; whether or a number of applications by the entity to job openings offered by one or more organizations in the certain region; or whether or a number of requests by the entity to view profiles of other entities affiliated with one or more organizations in the certain region.

17. The one or more storage media of claim 12, wherein the machine-learned prediction model is based on a plurality of features, wherein the plurality of features includes one or more of: whether or a number of times an entity has initiated a search and selected a search result that is associated with a certain region; the entity adding one or more skills to a profile of the entity; or the entity receiving an endorsement from another entity.

18. The one or more storage media of claim 12, wherein the machine-learned prediction model is based on a plurality of user-related features and a plurality of region-centric features.

19. The one or more storage media of claim 18, wherein the plurality of region-centric features includes one or more of: a number of job openings in a certain region; a cost of living in the certain region; an amount, level or rate of taxes associated with the certain region; a quality of public schools in the certain region; a quality of public utilities in the certain region; or a cost of public utilities in the certain region.

20. The method of claim 12, further comprising:
for a particular skill in the plurality of skills, determining a net skill flow for the particular skill;
wherein causing the skill data to be presented on the computer display comprises causing the net skill flow for the particular skill to be presented on the computer display.

* * * * *

UNITED STATES PATENT AND TRADEMARK OFFICE
CERTIFICATE OF CORRECTION

PATENT NO. : 11,238,352 B2  
APPLICATION NO. : 15/941236  
DATED : February 1, 2022  
INVENTOR(S) : Kuan et al.

Page 1 of 1

It is certified that error appears in the above-identified patent and that said Letters Patent is hereby corrected as shown below:

In the Claims

In Column 23, Line 15, in Claim 13, after "more", insert --non-transitory--

In Column 23, Line 28, in Claim 14, after "more", insert --non-transitory--

In Column 23, Line 42, in Claim 15, after "more", insert --non-transitory--

In Column 24, Line 5, in Claim 16, after "more", insert --non-transitory--

In Column 24, Line 19, in Claim 17, after "more", insert --non-transitory--

In Column 24, Line 27, in Claim 18, after "more", insert --non-transitory--

In Column 24, Line 31, in Claim 19, after "more", insert --non-transitory--

In Column 24, Line 39, in Claim 20, delete "method" and insert --one or more non-transitory storage media-- therefor Signed and Sealed this  
Twenty-ninth Day of March, 2022

Drew Hirshfeld  
*Performing the Functions and Duties of the  
Under Secretary of Commerce for Intellectual Property and  
Director of the United States Patent and Trademark Office*